United States Patent
Block

(10) Patent No.: US 6,582,635 B1
(45) Date of Patent: Jun. 24, 2003

(54) METHOD OF MAKING A COLD CURED COMPOSITE MOLDED ARTICLE

(75) Inventor: Howard V. Block, Johnston, IA (US)

(73) Assignee: Welch Products, Inc., Carlisle, IA (US)

( * ) Notice: Subject to any disclaimer, the term of this patent is extended or adjusted under 35 U.S.C. 154(b) by 297 days.

(21) Appl. No.: 09/677,209

(22) Filed: Oct. 2, 2000

(51) Int. Cl.[7] ............................................. B29C 70/58
(52) U.S. Cl. ...................... 264/109; 264/241; 264/313; 264/337
(58) Field of Search ................................ 264/109–128, 264/313, 241, 337

(56) References Cited

U.S. PATENT DOCUMENTS

| | | | |
|---|---|---|---|
| 3,995,003 A | * 11/1976 | Potter et al. ................ | 264/122 |
| 4,233,368 A | * 11/1980 | Baehr et al. ................ | 264/121 |
| 4,265,979 A | * 5/1981 | Baehr et al. ................ | 264/121 |

* cited by examiner

Primary Examiner—Stephen J. Lechert, Jr.
(74) Attorney, Agent, or Firm—Sturm & Fix LLP

(57) ABSTRACT

A method of making a cold cured composite molded article utilizes a mold requiring pressure in only one dimension. The mold is filled with a composite material and closed. The mold is then inserted between two series of rollers, wherein the rollers are positioned at a specified distance from each other such that the proper amount of pressure is applied to the mold. The mold is propelled through the two series of rollers by motorizing at least some of the rollers. The cure time is controlled by controlling the speed at which the mold is propelled through the two series of rollers.

10 Claims, 1 Drawing Sheet

METHOD OF MAKING A COLD CURED COMPOSITE MOLDED ARTICLE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates generally to composite molded articles and the process of making the composite molded articles and more specifically to a method for applying pressure to the mold during the curing process.

2. Description of the Related Art

Those concerned with these and other problems recognize the need for an improved Method of Making a Cold Cured Composite Molded Article.

The use of polyurethane adhesives or binders for binding particulate materials is well know. The materials are thoroughly mixed until the polyurethane has fully integrated with the particulate material. The mixture is then compacted in a mold or press to the desired density and cured using heat, moisture, usually in the form of steam, and time. Pressure is required to maintain the shape and density of the article while heat is used to reduce the cure times. For all practical purposes, the use of heat is required during many curing processes.

In the situation where heat is utilized, typically the material will be pressed and heated by the same apparatus. The molds for this press must be able to withstand the heat repeatedly applied and can therefore be expensive to produce and alter. Additionally, the apparatus maintains the pressure until the heat curing is complete. The article is then removed from the press and the process starts again.

In the situations where heat is not utilized, i.e. a cold curing, the material is placed in a mold. Pressure must then be applied to the mold until the curing is complete. An apparatus such as is used in the heat curing systems can be utilized to provide the pressure without heat but is excessive in terms of what is actually needed.

Thus, there is a need to overcome the aforementioned drawbacks and a need for an improved method of making a cold cured composite article.

BRIEF SUMMARY OF THE INVENTION

The present invention relates generally to composite molded articles and the process of making the composite molded articles and more specifically to a method for applying pressure to the mold during a cold curing process.

The present invention utilizes molds which require pressure in only one direction or dimension during the cold curing process. The mold is filled with the composite material, and inserted between two series of rollers. The rollers are positioned at an appropriate distance such that the proper amount of pressure is applied to the mold in the requisite direction or dimension.

At least some of the rollers are motorized such that the mold is propelled, though typically not at a great speed, through the two series of rollers. The cure time is controlled by controlling how fast the mold is propelled through the rollers.

Therefore, an object of the present invention is the provision of an improved Method of Making a Cold Cured Composite Molded Article.

Another object is to provide a Method of Making a Cold Cured Composite Molded Article utilizing molds requiring pressure in only one direction or dimension.

A further object is to provide a Method of Making a Cold Cured Composite Molded Article which is economical and efficient.

Other objects, advantages, and novel features of the present invention will become apparent from the following detailed description of the invention when considered in conjunction with the accompanying drawings.

DETAILED DESCRIPTION OF THE INVENTION

Figure 1:
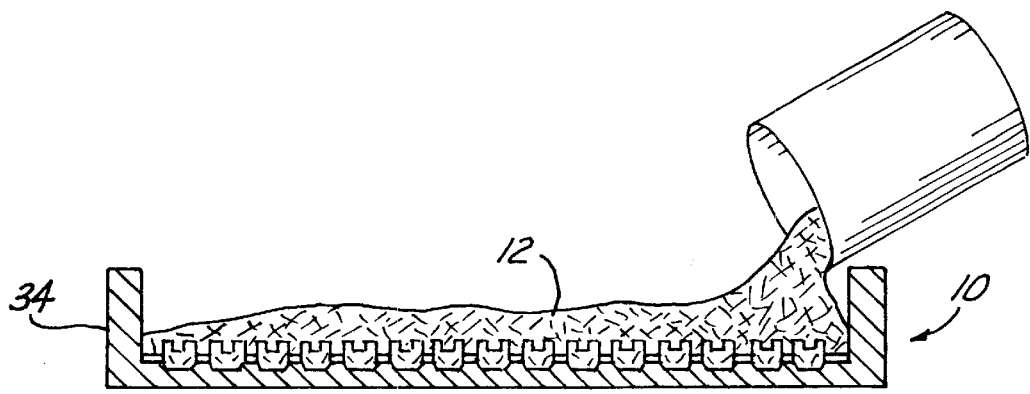
FIG. 1 is a partial side view of a mold being filled with composite material in accordance with the present invention.

The present invention can be fully appreciated and understood in view of the following detail description and in view of the drawings wherein like reference numerals designate identical or corresponding parts throughout the several views. It should be understood that the following discussion is for illustrative purposes and that the invention can be practiced with modifications without materially departing from the novel teachings and advantages of this invention. Accordingly, all such modifications are intended to be included within the scope of this invention as defined in the following claims.

Figure 2:
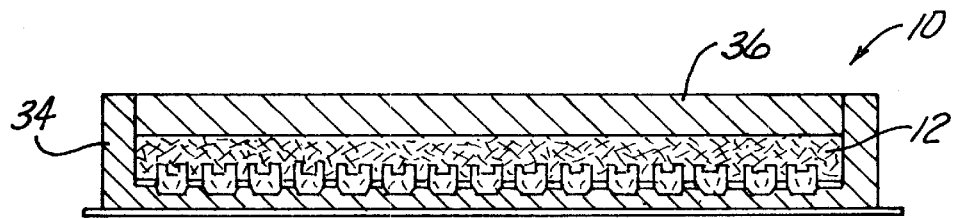
FIG. 2 is a partial side view of a closed mold after being filled with a composite material.
Figure 3:
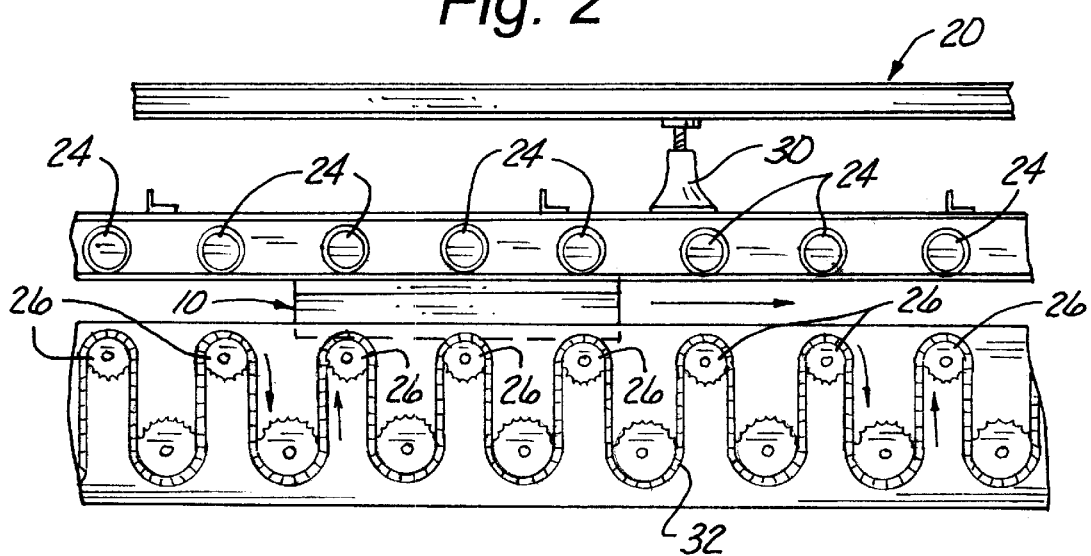
FIG. 3 is a compression system used in accordance with the preferred method of the present invention to maintain pressure during the curing process.

The present invention comprises an improved method of making a cold cured composite molded article. However, the present invention could work in virtually any curing process in which heat is not required. Referring to FIGS. 1–3, in the method of the present invention, a mold (10) if filled with a material (12) to be cured. Inasmuch as the molds will not be subjected to heat, the molds can be made from a variety of materials. Plastic or aluminum are preferred because they are lightweight and, therefore, easy to handle.

The mold (10) is filled should be filled with an appropriate amount material (12) since in the present invention the pressure by compaction is controlled by distance and not pressure. Overfilling the mold could create too much pressure while under-filling the mold could result in too little pressure.

The mold (10) is closed and inserted into a compression system (20) which is includes two sets of rollers (24 and 26). The two sets of rollers (24 and 26) are spaced apart from one another to assert the appropriate pressure on the mold (10). At least some of the rollers, in this embodiment the lower rollers (26), can be motorized such that the mold (10) is propelled through the rollers (24 and 26). By controlling the speed of the rollers, the cure time for the material (12) in the mold (10) can by controlled. In other words, controlling the roller speed controls the total time it takes for the mold to pass through the two sets of rollers. The time it takes to pass through the rollers needs to be sufficient to insure that the curing process has occured.

The distance between the rollers can be changed to accommodate various molds. In the embodiment shown, a screw jack (30) is used to raise and lower the upper rollers (24) while the motorized lower rollers (26) remain stationary. The motorization in the present embodiment is effectuated with a chain (32) driven by a motor (not shown). A variety of methods could be utilized to control the spacing and to motorize the rollers. All of these methods should be considered within the scope of the method claimed below.

The molds utilized in the present invention must be designed to require pressure in only one direction or dimension inasmuch as the rollers are only capable of applying the pressure in one dimension. Furthermore, the molds must be designed to provide appropriate surfaces to which the pressure of the rollers can be applied.

The mold (10) as shown is comprised of two components; a base (34) and a lid (36). The base (34) is filled with the material (12) and then closed with the lid (36). In the mold shown, it is clear why the appropriate amount of material (12) must be used. With the lid (36) on, two parallel planer surfaces are created to receive the pressure from the rollers (24 and 26). As indicated above, the surfaces must be appropriate to receive the pressure from the rollers. This does not necessarily imply that the surfaces need be planer. A variety of other surfaces could be configures to appropriately transfer the pressure of the rollers (24 and 26) through the mold (10) to the material (12) inside.

As mentioned above, the material can be virtually any material which requires pressure during curing. By way of example only, the material could be a polyurethane adhesive or binder and a particulate material such as recycled rubber or plastic.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

I claim:

1. A method of making a cold cured composite molded article, comprising the steps of:
    utilizing a mold requiring pressure in only one dimension;
    filling the mold with a composite material;
    closing the mold;
    inserting the mold between two series of rollers, wherein the rollers are positioned at a specified distance from each other such that the proper amount of pressure is applied to the mold for a predetermined cure time; and
    controlling the cure by controlling the speed at which the mold is propelled through the two series of rollers.

2. The method according to claim 1 including the step of:
    propelling the inserted mold through the two series of rollers by motorizing at least some of the rollers.

3. The method in claim 1 wherein the mold is formed of plastic material.

4. The method in claim 2 wherein the mold is formed of plastic material.

5. The method in claim 1 wherein the mold is formed of aluminum.

6. The method of claim 2 wherein the mold is formed of aluminum.

7. The method in claim 1 wherein the composite material includes a binder and particulate material.

8. The method of claim 7 wherein the binder is polyurethane adhesive.

9. The method of claim 7 wherein the particulate material is recycled rubber.

10. The method of claim 7 wherein the particulate material is recycled plastic.

* * * * *